(12) United States Patent  
Paine

(10) Patent No.: US 10,955,169 B2  
(45) Date of Patent: Mar. 23, 2021

(54) CONTROL SYSTEM FOR MODULATING WATER HEATER

(71) Applicant: Lochinvar, LLC, Lebanon, TN (US)

(72) Inventor: John C. Paine, Brentwood, TN (US)

(73) Assignee: Lochinvar, LLC, Lebanon, TN (US)

( * ) Notice: Subject to any disclaimer, the term of this patent is extended or adjusted under 35 U.S.C. 154(b) by 179 days.

(21) Appl. No.: 16/365,885

(22) Filed: Mar. 27, 2019

(65) Prior Publication Data

US 2019/0285316 A1 Sep. 19, 2019

Related U.S. Application Data

(60) Continuation of application No. 14/807,692, filed on Jul. 23, 2015, now Pat. No. 10,247,446, which is a (Continued)

(51) Int. Cl.
*F22B 35/00* (2006.01)
*F24H 9/20* (2006.01)
(Continued)

(52) U.S. Cl.
CPC ............ *F24H 9/2035* (2013.01); *F23N 1/082* (2013.01); *F24D 19/1009* (2013.01); (Continued)

(58) Field of Classification Search
CPC ......... F24F 11/00; F24F 11/30; F22B 35/008; F23N 2041/04; F24D 2200/043; Y02B 30/108

See application file for complete search history.

(56) References Cited

U.S. PATENT DOCUMENTS 2,642,046 A 6/1953 Alexander
3,249,303 A 5/1966 Townsend
(Continued)

FOREIGN PATENT DOCUMENTS

EP 267649 A1 5/1988
EP 340611 A2 11/1989
(Continued)

OTHER PUBLICATIONS

Rinnai, Service Manual, REU-16FUA-E, "Infinity 16i" (67 pages)(2005).
(Continued)

*Primary Examiner* — Gregory A Wilson
(74) *Attorney, Agent, or Firm* — Lucian Wayne Beavers; Patterson Intellectual Property Law, PC

(57) ABSTRACT

A control system is provided for a modulated heating system including a plurality of modulating water heaters, which may be modulating boilers. A deadband control scheme provides for reduced cycling of the modulating heater when total system heat demand falls between the maximum output of one heater and the sum of the maximum output of that one point and the minimum firing point of the next subsequent heater. Condensation of flue gas products is prevented by monitoring flue exhaust temperature for each heater and controlling the modulation of each heater to maintain a minimum heater output sufficiently high to prevent condensation of flue gas products from that heater. Rapid reaction to changes in system heat demand is provided by sensing changes in flow rate in a primary loop of the system and anticipating resulting changes in temperature thus allowing for change in heater output prior to the time the change in flow rate has fully impacted system temperature.

19 Claims, 5 Drawing Sheets

Related U.S. Application Data division of application No. 13/454,498, filed on Apr. 24, 2012, now Pat. No. 9,097,431, which is a division of application No. 12/266,777, filed on Nov. 7, 2008, now Pat. No. 8,186,312, which is a division of application No. 11/684,049, filed on Mar. 9, 2007, now Pat. No. 7,506,617.

(51) Int. Cl.
  *F23N 1/08* (2006.01)
  *F24D 19/10* (2006.01)

(52) U.S. Cl.
  CPC .... *F23N 2241/04* (2020.01); *F24D 2200/043* (2013.01); *Y02B 30/00* (2013.01)

(56) References Cited

U.S. PATENT DOCUMENTS

| | | | |
|---|---|---|---|
| 3,387,589 A | 6/1968 | Chan et al. | |
| 3,576,177 A | 4/1971 | Block et al. | |
| 4,011,989 A | 3/1977 | Diggs | |
| 4,028,884 A * | 6/1977 | Martz | F01K 23/108 60/39.182 |
| 4,401,261 A * | 8/1983 | Brown | F28D 21/0007 122/20 B |
| 4,534,321 A | 8/1985 | Rydborn | |
| 4,542,849 A | 9/1985 | Pichot et al. | |
| 4,556,168 A | 12/1985 | Romanow et al. | |
| 4,572,110 A * | 2/1986 | Haeflich | F01K 23/108 122/1 R |
| 4,598,668 A | 7/1986 | Bader | |
| 4,723,513 A | 2/1988 | Vallett et al. | |
| 4,793,800 A | 12/1988 | Vallett et al. | |
| 4,798,240 A | 1/1989 | Gerstmann et al. | |
| 4,813,396 A † | 3/1989 | Sargeant | |
| 4,852,524 A * | 8/1989 | Cohen | F24H 1/285 122/448.1 |
| 4,860,696 A | 8/1989 | Fujita | |
| 4,864,972 A * | 9/1989 | Batey | F22B 35/008 122/448.3 |
| 4,868,370 A | 9/1989 | Kroon | |
| 4,970,373 A | 11/1990 | Lutz et al. | |
| 5,042,431 A | 8/1991 | Shprecher et al. | |
| 5,074,226 A * | 12/1991 | Lynch | F23J 15/003 110/345 |
| 5,245,952 A | 9/1993 | Vasilakis | |
| 5,315,941 A * | 5/1994 | Vetterick | F23J 15/003 110/345 |
| 5,326,536 A * | 7/1994 | Carter | B01D 53/56 110/190 |
| 5,357,907 A | 10/1994 | Moore et al. | |
| 5,428,347 A | 6/1995 | Barron | |
| 5,452,687 A | 9/1995 | Christiansen | |
| 5,504,306 A | 4/1996 | Russell et al. | |
| 5,655,710 A * | 8/1997 | Kayahara | F24D 12/02 237/81 |
| 5,660,165 A | 8/1997 | Lannes | |
| 5,775,268 A * | 7/1998 | Ferguson | F24H 1/36 122/18.31 |
| 5,881,681 A | 3/1999 | Stuart | |
| 5,989,020 A | 11/1999 | Glass et al. | |
| 6,170,440 B1 | 1/2001 | Monnier et al. | |
| 6,279,593 B1 | 8/2001 | Sheppard | |
| 6,370,328 B1 | 4/2002 | Mottershead | |
| 6,397,787 B1 | 6/2002 | Yamada et al. | |
| 6,428,312 B1 | 8/2002 | Smelcer et al. | |
| 6,591,901 B2 | 7/2003 | Bujak | |
| 6,612,267 B1 | 9/2003 | West | |
| 6,619,951 B2 | 9/2003 | Bodnar et al. | |
| 6,640,047 B2 | 10/2003 | Murahashi et al. | |
| 6,647,932 B1 | 11/2003 | Cui et al. | |
| 6,694,926 B2 | 2/2004 | Baese et al. | |
| 6,723,459 B2 * | 4/2004 | Strohle | H01M 8/04007 429/435 |
| 6,907,846 B2 | 6/2005 | Hur et al. | |
| 7,020,387 B1 | 3/2006 | Andrakin | |
| 7,298,968 B1 | 11/2007 | Boros et al. | |
| 7,460,769 B2 | 12/2008 | Ryks | |
| 7,506,617 B2 | 3/2009 | Paine | |
| 7,819,334 B2 | 10/2010 | Pouchak et al. | |
| 2003/0005892 A1 | 1/2003 | Baese et al. | |
| 2003/0134241 A1 * | 7/2003 | Marin | F23L 7/007 431/9 |
| 2004/0231332 A1 * | 11/2004 | Saucedo | F23N 5/003 60/671 |
| 2005/0016204 A1 * | 1/2005 | Zhang | F25B 15/06 62/476 |
| 2005/0177281 A1 | 8/2005 | Caves et al. | |
| 2005/0230491 A1 | 10/2005 | Pouchak et al. | |
| 2008/0179415 A1 | 7/2008 | Johnson | |
| 2008/0179416 A1 * | 7/2008 | Johnson | F24D 19/1012 237/8 A |
| 2008/0197205 A1 | 8/2008 | Ene et al. | |
| 2008/0265046 A1 | 10/2008 | Grimes | |
| 2011/0041781 A1 | 2/2011 | Deivasigamani et al. | |
| 2012/0060827 A1 | 3/2012 | Roetker | |
| 2012/0090560 A1 | 4/2012 | Iwama et al. | |
| 2012/0138149 A1 | 6/2012 | Hatada et al. | |
| 2012/0204816 A1 | 8/2012 | Paine | |
| 2012/0216998 A1 | 8/2012 | Kim et al. | |
| 2012/0324893 A1 * | 12/2012 | Hayashi | F22D 1/40 60/691 |
| 2012/0325337 A1 | 12/2012 | Nakagawa et al. | |
| 2014/0020676 A1 | 1/2014 | Wehner | |
| 2014/0116357 A1 * | 5/2014 | Yano | F24H 9/2035 122/14.2 |
| 2015/0168020 A1 | 6/2015 | Wehner | |

FOREIGN PATENT DOCUMENTS

| | | |
|---|---|---|
| EP | 1063480 A2 | 12/2000 |
| EP | 1218672 A1 | 7/2002 |
| GB | 2233077 A | 1/1991 |
| JP | 58096920 A | 6/1983 |
| JP | 61101742 A | 5/1986 |
| JP | 01300153 A | 12/1989 |
| JP | 05256515 A | 10/1993 |
| JP | 06117689 A | 4/1994 |
| JP | 08247550 A | 9/1996 |
| JP | 2001021214 A | 1/2001 |
| JP | 2006250497 A | 9/2006 |
| JP | 2007244689 A | 9/2007 |
| JP | 2007255775 A | 10/2007 |
| KR | 1019990027494 A | 4/1999 |
| KR | 1019990053126 A | 7/1999 |
| KR | 100245421 B1 | 11/1999 |
| WO | 2006-034529 * | 9/2005 |
| WO | 2006034529 A1 † | 4/2006 |

OTHER PUBLICATIONS

Rinnai, Service Manual, Infinity REU-V3232W, HD250E REU-3232WC (62 pages)(2003).

Bradford White, EverHot Tankless Gas Water Heater, Service Manual (64 pages)(undated but admitted to be prior art).

Bradford White, Tankless Gas Replacement Parts List, EverHot IGI 180 (C,R)(5,10) Models (12 pages)(2004).

Bosch AquaStar, Installation and Operating Instructions for Automatic Instantaneous Type Water Heaters for Use With Natural and Liquefied Petroleum Gas, Model 125X LP and 125X NG (16 pages)(2001).

J.G. Ziegler and N.B. Nichols: Optimum Settings for Automatic Controllers, Trans. ASME, vol. 64, pp. 759-765, (1942).

\* cited by examiner
† cited by third party

CONTROL SYSTEM FOR MODULATING WATER HEATER

BACKGROUND OF THE INVENTION

1. Field of the Invention

The present invention relates generally to water heaters and boilers, and more particularly, but not by way of limitation, to a control system for a modulating water heater or boiler which is particularly constructed for use as one of a plurality of water heaters or boilers controlled in a cascading sequence.

2. Description of the Prior Art

Conventional water heater technology utilizes a burner designed to operate at a fixed flow rate of combustion air and fuel gas to the burner. Such a water heater cycles on and off in response to a control system which monitors the temperature of water in a storage tank or elsewhere in various conduits of the water supply system. One example of such a typical prior art system which is presently being marketed by the assignee of the present invention is that shown in U.S. Pat. Nos. 4,723,513 and 4,793,800 to Vallett et al., the details of which are incorporated herein by reference.

It has been recognized that, in circumstances where there is a substantially varying demand for heat input to the water supply system, greater energy efficiencies can be achieved through the use of a water heater which is capable of operating at different energy inputs. One example of such a system is that sold by Lochinvar Corporation, the assignee of the present invention, under the trademark COPPER-FIN II®. The Lochinvar COPPER-FIN II® system utilizes a plurality of staged burners which can be brought on-line or taken off-line as the demand for heat energy changes. The COPPER-FIN II® unit includes multiple banks, for example, first, second, third and fourth stages. It initially turns on all four stages of burners, and as it approaches the desired temperature, it sequentially shuts off units to decrease the input energy. This type of system provides variable input, but it is not continuously variable. Instead the input can be changed only in substantial increments corresponding to the heat output of one burner stage.

The prior art has also included proposals for water heaters having continuously variable output over a range of outputs. Two such systems are shown in U.S. Pat. No. 4,852,524 to Cohen and U.S. Pat. No. 5,881,681 to Stuart. These systems, which have been marketed by Aerco International, Inc. under the Benchmark name, utilize a nozzle mix burner which receives independent streams of combustion air and fuel gas. A fuel/air valve is utilized to simultaneously control the flow of air through the air line and fuel through the fuel line so as to provide a varying input of fuel and air while maintaining a constant fuel to air ratio. The blower speed remains constant on these systems.

More recently the assignee of the present invention has developed a continuously variable water heater with variable air and fuel input, as shown in U.S. Pat. No. 6,694,926 to Baese et al. In the Baese apparatus a variable flow blower provides premixed combustion air and fuel to the burner at a controlled blower flow rate within a blower flow rate range. This allows the heat output of the water heater to be continuously varied within a substantial flow range having a turndown ratio of as much as 4:1.

Various systems for controlling a plurality of modulating boilers are described in U.S. Pat. No. 5,042,431 to Shprecher et al., including systems in which the last boiler turned on is the modulating boiler.

In large commercial operations it is common to utilize a plurality of commonly controlled heat exchangers such as those of the Vallett et al. patents or the Baese et al. patent described above. A number of unique problems are encountered when using such heaters in groups, and the present invention is directed to improved control systems for such boilers.

SUMMARY OF THE INVENTION

The present invention provides a control system particularly suited for use with a plurality of modulating water heaters, which may be boilers, arranged for control in a cascade sequence wherein a first boiler is brought online at its firing point and is then continuously modulated up to its maximum output, and then the first boiler is maintained at its constant output while firing a second boiler which is then modulated from its firing point up to its maximum output as the overall heat demand on the system increases. In similar manner, each boiler is brought up to its maximum output before the next adjacent boiler is fired, and all previously fired boilers are maintained at maximum output with the modulation for the system coming from modulation of the last fired boiler.

One challenge encountered with a system of modulating boilers like that just described is to minimize the cycling on and off of each boiler. As will be appreciated by those skilled in the art, the various components of the boiler and control system encounter more wear in cycling on and off than in constant operation, and particularly items such as the hot surface igniter are susceptible to requiring maintenance if they are cycled an excessive number of times. The present invention reduces this cycling by addressing several issues encountered in certain operating conditions with such a system.

In one aspect of the invention a unique control routine is provided for those situations wherein the overall heat demand for the system of a plurality of boilers falls within a zone lying between the maximum heat output of the first boiler and the sum of the maximum heat output of the first boiler and the minimum heat output of the next adjacent boiler. This zone, which may be referred to as a deadband or dead zone, presents unique operational problems because the second boiler cannot modulate within that range. This problem is addressed by allowing the water supply temperature which is being sensed by the control system to vary within a defined temperature range spanning a temperature set point before the second boiler is turned on or off. Once the second boiler is turned on it is maintained at a constant output, preferably its minimum output, until the water supply temperature reaches or exceeds the upper end of the defined temperature range. The defined temperature range is preferably the temperature set point plus or minus a constant. The constant lies in the range of from 3° F. to 7° F. and is preferably about 5° F.

Another issue encountered in commercial heating systems is that the flow rate of the water in the primary heating loop can change frequently and by a significant amount as heating zones are turned on and off. As this flow changes, the heat load on the system typically changes with it. In prior art systems the only indication the boiler has that heat load has changed is when one of the temperature sensors detects a change in system temperature. But the change in system temperature lags significantly in time behind the change in flow rate, and causes undesirable swings in system temperature and on and off cycling of the boiler as the boiler control system attempts to correct for the change in temperature. This problem is addressed by monitoring the flow rate within the system and then utilizing an algorithm to predict the change in heat load which will result from that change in flow rate, and varying the firing rate of the boiler to correspond to the expected change in heat load. This allows the boiler to react much more quickly to changes in system demand and significantly reduces temperature swings in the system and reduces cycling of the boiler itself.

A third issue encountered in these multiple boiler systems is the problem of condensation of water vapor in exhaust flue gasses. Such condensation is acidic, and therefore if condensation is expected much more expensive Category IV venting materials are required by codes, with separate flue vents for each boiler. On the other hand, if the temperature of the exhaust flue gasses can be reliably controlled and maintained above a temperature at which the water vapor will condense from the exhaust gasses, then much more economical Category I materials may be utilized and a common exhaust flue may be used for multiple boilers. This is particularly a problem with modulating boilers and systems of modulating boilers because as the power demands change and the power output of each boiler changes its exhaust gas temperature changes. This problem is addressed by providing an exhaust gas temperature sensor in each boiler and controlling the modulation range of each boiler during modulation so that the boiler is not allowed to operate below a minimum heat output, which is typically significantly greater than the minimum firing point for the boiler, and is high enough to maintain boiler exhaust gas temperatures at the required level. This will reduce the practical modulation range for each boiler, thus increasing the width of the deadbands noted above.

Accordingly it is an object of the present invention to provide improved control systems for modulating water heaters.

Another object of the present invention is the provision of an improved control system for a modulating water heater utilizing premixed air and gas.

Still another object of the present invention is the provision of control systems for pluralities of modulating water heaters arranged in a cascading control sequence.

Still another object of the present invention is the provision of control systems which will reduce cycling of modulating water heaters.

Yet another object of the present invention is the provision of a control system that reduces cycling of a modulating water heater when a plurality of heaters are called upon to provide a combined heat output which falls in a deadband between the modulating range of one heater and that of the next subsequent heater.

Still another object of the present invention is the provision of a control system which allows early detection of changes in system heat load by sensing changes in water flow before those changes have had time to significantly impact water temperature.

Yet another object of the present invention is the provision of control systems for preventing condensation of water vapor from exhaust flue gasses in multiple water heater systems.

Other and further objects features and advantages of the present invention will be readily apparent to those skilled in the art upon a reading of the following disclosure when taken in conjunction with the accompanying drawings.

DETAILED DESCRIPTION OF THE PREFERRED EMBODIMENTS

Figure 1:
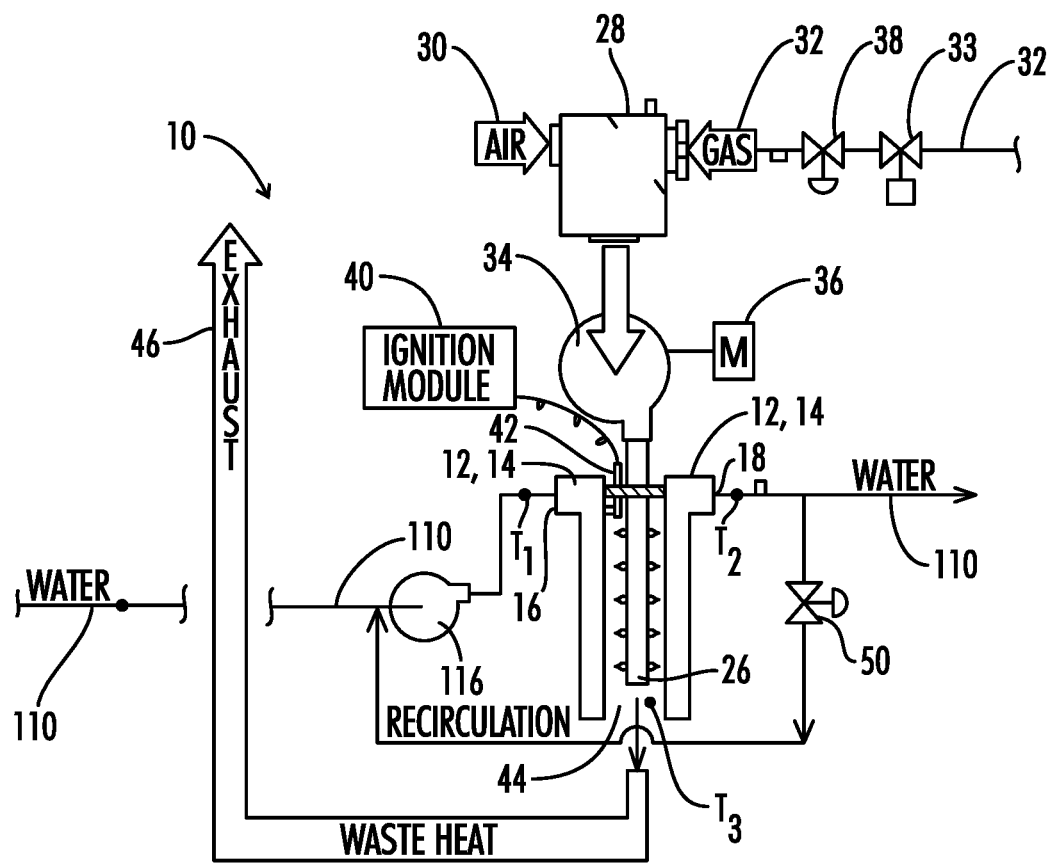
FIG. 1 is a schematic illustration of a single boiler or water heater of the present invention.

Referring now to the drawings, and particularly to FIG. 1, the water heater or boiler apparatus of the present invention is shown and generally designated by the numeral 10. As used herein, the term water heater refers to an apparatus for heating water, including both steam boilers and water heaters that do not actually "boil" the water. Much of this discussion refers to the apparatus 10 as a boiler 10, but it will be understood that this description is equally applicable to water heaters that do not boil the water. The boiler 10 includes a heat exchanger 12 having a water side 14 having a water inlet 16 and a water outlet 18.

Figure 2:
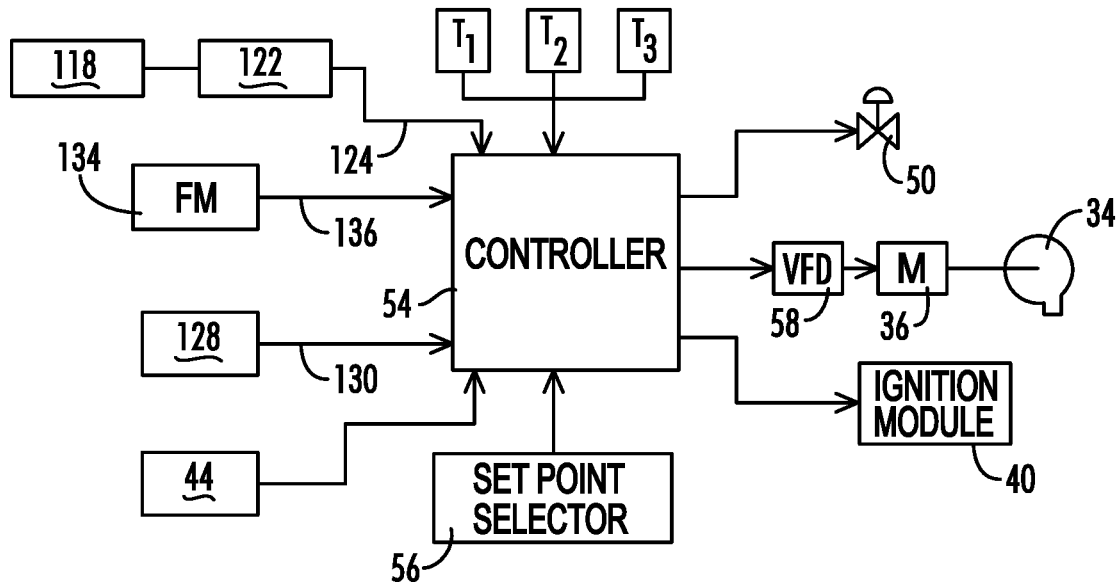
FIG. 2 is a schematic illustration of the individual control system associated with a single one of the boilers like that of FIG. 1.
Figure 3:
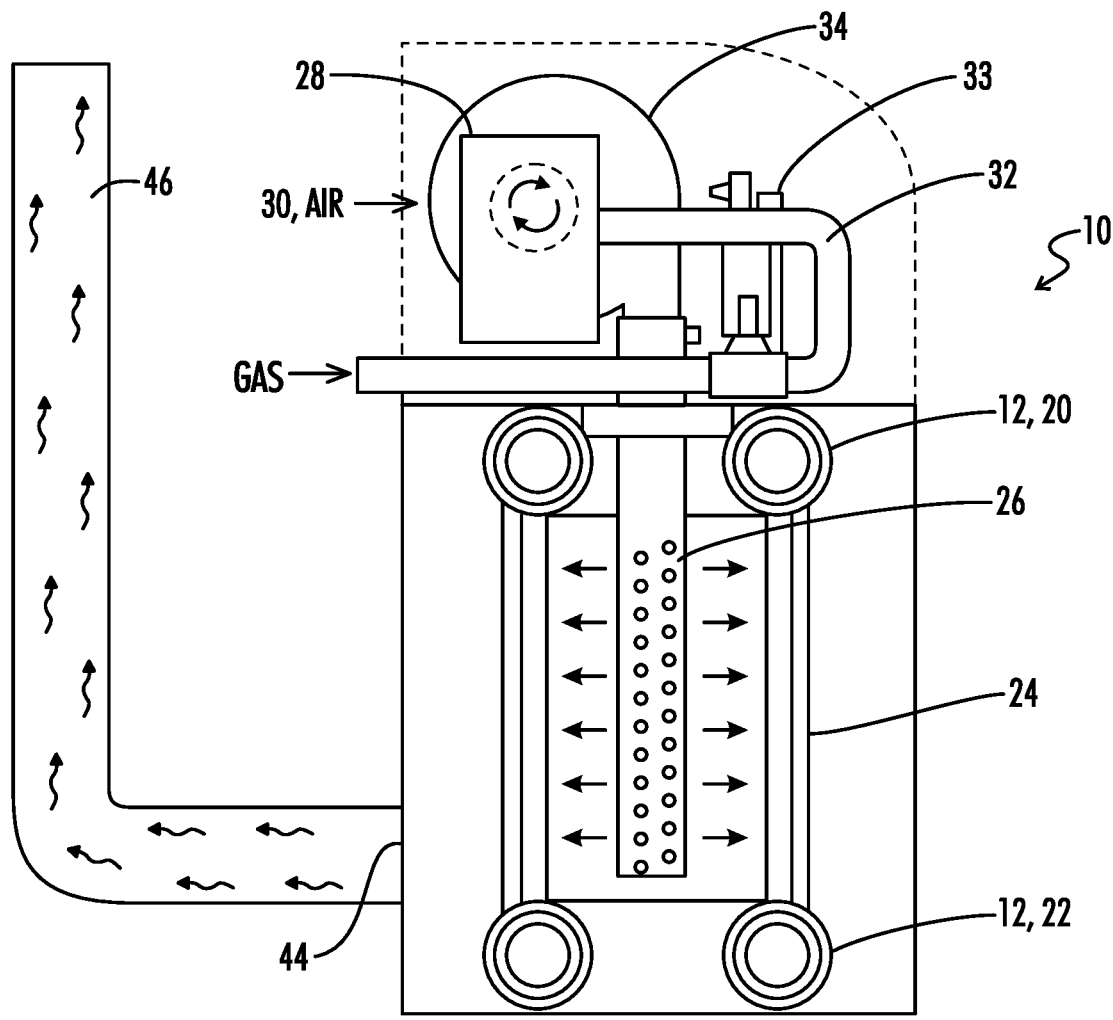
FIG. 3 is a schematic elevation section view of the boiler of FIG. 1.

The general construction of the heat exchanger 12 may be similar to that disclosed for example in U.S. Pat. No. 4,793,800 to Vallett et al., or that in U.S. Pat. No. 6,694,926 to Baese et al., the details of which are incorporated herein by reference. As illustrated in FIGS. 2, 8 and 9 of Vallett et al., the heat exchanger is a multiple pass exchanger having a plurality of fin tubes arranged in a circular pattern with a burner located concentrically within the circular pattern of fin tubes. This structure is schematically illustrated in FIG. 3 of the present application wherein the heat exchanger 12 is shown to have upper and lower headers 20 and 22 connected by a plurality of vertically oriented fin tubes 24.

Figure 4:
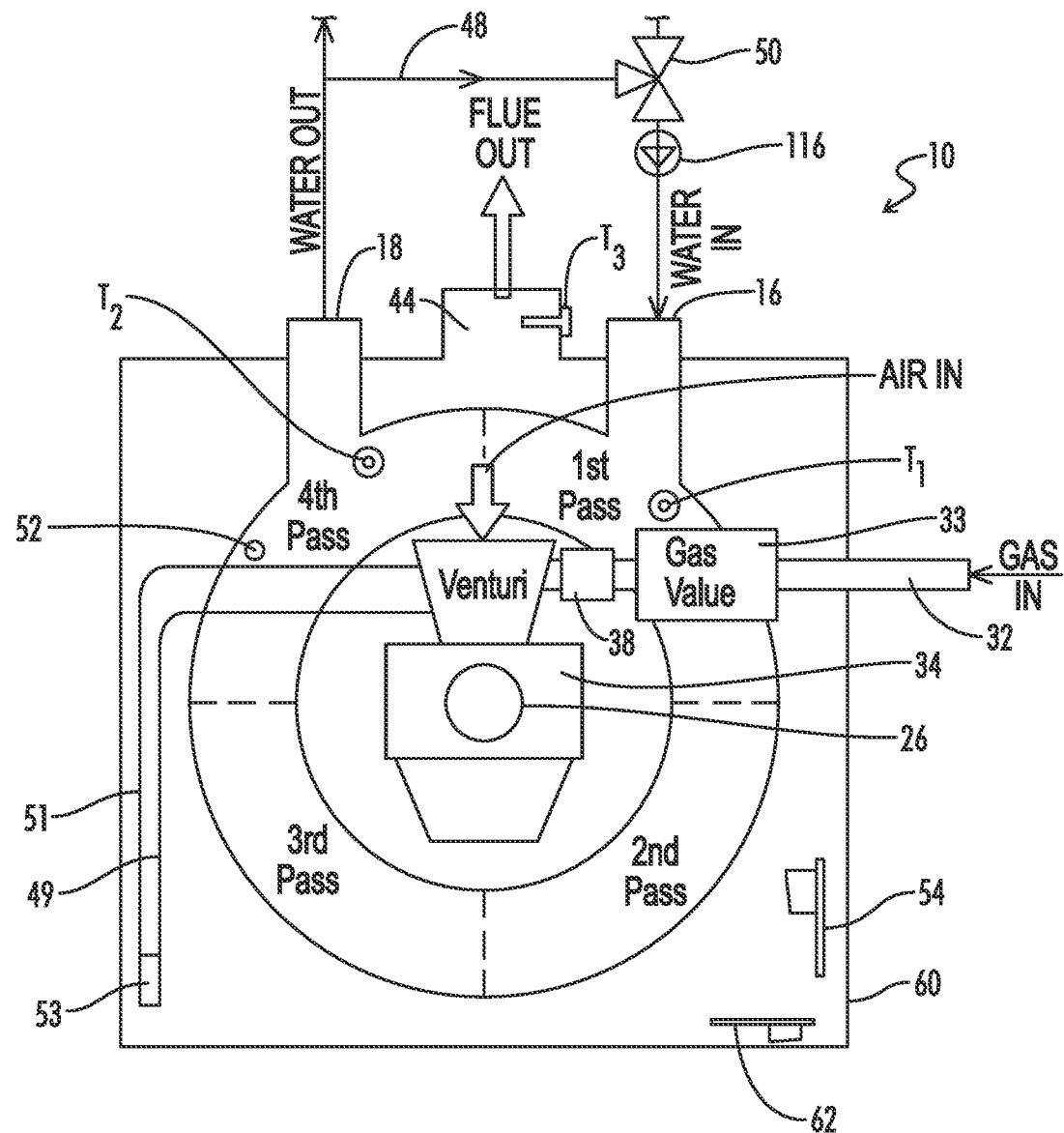
FIG. 4 is a schematic plan view of the boiler of FIG. 1 including the primary hydraulic connections, the exhaust gas flue outlet and various internal sensors.

A burner 26 is concentrically received within the circular array of fin tubes 24. The burner 26 is operatively associated with the heat exchanger 12 for heating water which is contained in the water side 14 of the heat exchanger 12. As schematically illustrated in FIG. 4, the water flowing through the water side 14 of heat exchanger 12 flows in four passes through the interior of the various fin tubes 24 between the upper and lower headers 20 and 22. Within each fin tube 24, the water receives heat from the burner 26 that is radiating directly upon the exterior fins of the fin tubes 24.

The burner 26 may be constructed in any suitable manner including that disclosed in Baese et al. U.S. Pat. No. 6,694,926, or in U.S. Pat. No. 6,619,951 to Bodnar et al., or U.S. Pat. No. 6,428,312 to Smelcer et al., all of which are incorporated herein by reference.

The burner 26 is of the type referred to as a premix burner which burns a previously mixed mixture of combustion air and fuel gas. In the system shown in FIG. 1, a venturi 28 is provided for mixing combustion air and fuel gas. An air supply duct 30 provides combustion air to the venturi 28. A gas supply line 32 provides fuel gas to the venturi 28. The venturi 28, may for example be a model VMU680 provided by Honeywell. A gas control valve 33 is disposed in supply line 32 for regulating the amount of gas entering the venturi 28. The gas control valve 33 includes an integral shut off valve.

In order to provide the variable output operation of the burner 26 a variable flow blower 34 delivers the premixed combustion air and fuel gas to the burner 26 at a controlled blower flow rate within a blower flow rate range. The blower 34 is driven by a variable frequency drive motor 36 (see FIG. 1).

The gas line 32 will be connected to a conventional fuel gas supply (not shown) such as a municipal gas line, with appropriate pressure regulators and the like being utilized to control the pressure of the gas supply to the venturi 28.

The gas control valve is preferably a ratio gas valve for providing fuel gas to the venturi 28 at a variable gas rate which is proportional to the flow rate entering the venturi 28, in order to maintain a predetermined air to fuel ratio over the flow rate range in which the blower 34 operates.

An ignition module 40 controls an electric igniter 42 associated with the burner 26.

Combustion gasses from the burner 26 exit the boiler 10 through a combustion gas outlet 44 which is connected to an exhaust gas flue 46.

As is further described below with reference to FIG. 5, the water inlet and outlet 16 and 18 will be connected to a secondary flow loop 110 of the heating system, and as schematically illustrated in FIG. 4 there is preferably a bypass 48 provided between the inlet and outlet 16 and 18 with a three way control valve 50 provided in the bypass 48 for allowing some recirculation of heated water when necessary to maintain an inlet temperature at water inlet 16 at a sufficiently high level to prevent condensation of water vapor from combustion gas products within the boiler 10.

A plurality of temperature sensors are located throughout the boiler apparatus 10 including sensor $T_1$ at the water inlet 16, sensor $T_2$ at the water outlet 18, and sensor $T_3$ at the exhaust gas outlet 44.

A high temperature limit switch 52 is provided for shutting down the boiler 10 in the event water temperature within the boiler 10 exceeds a predetermined limit which could damage the boiler.

An air pressure switch 53 is connected to venture 28 via lines 51 and 49 to monitor flow through venturi 28.

The Controller

A controller 54 is provided for the boiler 10. FIG. 2 provides a schematic illustration of the main inputs to the controller 54.

The controller 54 senses temperature from the water inlet and outlet temperature sensors $T_1$ and $T_2$, and senses temperature of the exhaust gas outlet sensor or flue sensor $T_3$.

A setpoint selection system 56 is provided in association with the controller 52 whereby an operator may input to the controller 52 the desired water temperature which is desired to be seen in a heating system to which the boiler will be connected, as is further described below with regard to FIG. 5. The setpoint selector 56 may be directly associated with the boiler 10, or the setpoint may be fed to the controller 54 of the boiler 10 from a building thermostatic control or the like.

The controller 54 will control a number of aspects of the boiler 10 in order to achieve the desired heat output. One function of the controller 54 is to control the flow rate of the blower 34. As previously noted, the blower 34 includes a fan which is driven by electric motor 36. The electric motor 36 is controlled by a variable frequency drive 58, which is in turn controlled by the controller 54. As will be understood by those skilled in the art, the variable frequency drive 58 varies the speed of the electric motor 36 and thus the output of the blower 34 by varying the frequency of an electrical power signal provided to the electric motor 36.

Preferably the controller 54 and associated control components are selected so as to provide a blower turndown ratio of at least 2:1, and more preferably at least 4:1. For example, with a blower turndown ratio of 2:1, the blower 34 would be operated within a range of from 50% of the maximum output to 100% of the maximum output. This provides a corresponding burner range of 50% to 100% of maximum burner output. For a turndown ratio of 4:1, the blower 34 would be operated in a range of from 25% of maximum to 100% of maximum output. Again, this variation in output is controlled by varying the frequency of the electrical signal sent by the variable frequency drive 58 to the electric motor 36 which in turn drives the blower 34.

The blower flow rate is continuously variable within the defined flow rate range. It will be understood that the term "continuously variable" is used in contrast to a staged burner system like that for example of the Lochinvar COPPER-FIN II® system described above. These continuously variable systems may in fact be variable in very small increments related to the digital nature of the control system, but for all practical purposes, the flow rate is continuously variable between its upper and lower limits.

A second function of the controller 54 is to control the position of recirculation valve 50 as previously described.

The controller 54 also operates in conjunction with the ignition module 40 which controls the electric igniter 42 associated with burner 26.

As seen in FIG. 4, the boiler apparatus 10 includes an external housing 60 in which the heat exchanger 12 is received. The controller 54 is provided in the form of an integrated control board located within the housing 60, and an operator interfaces with the controller 54 through an operator interface board 62.

A Multiple Boiler Variable Flow Heating System

Figure 5:
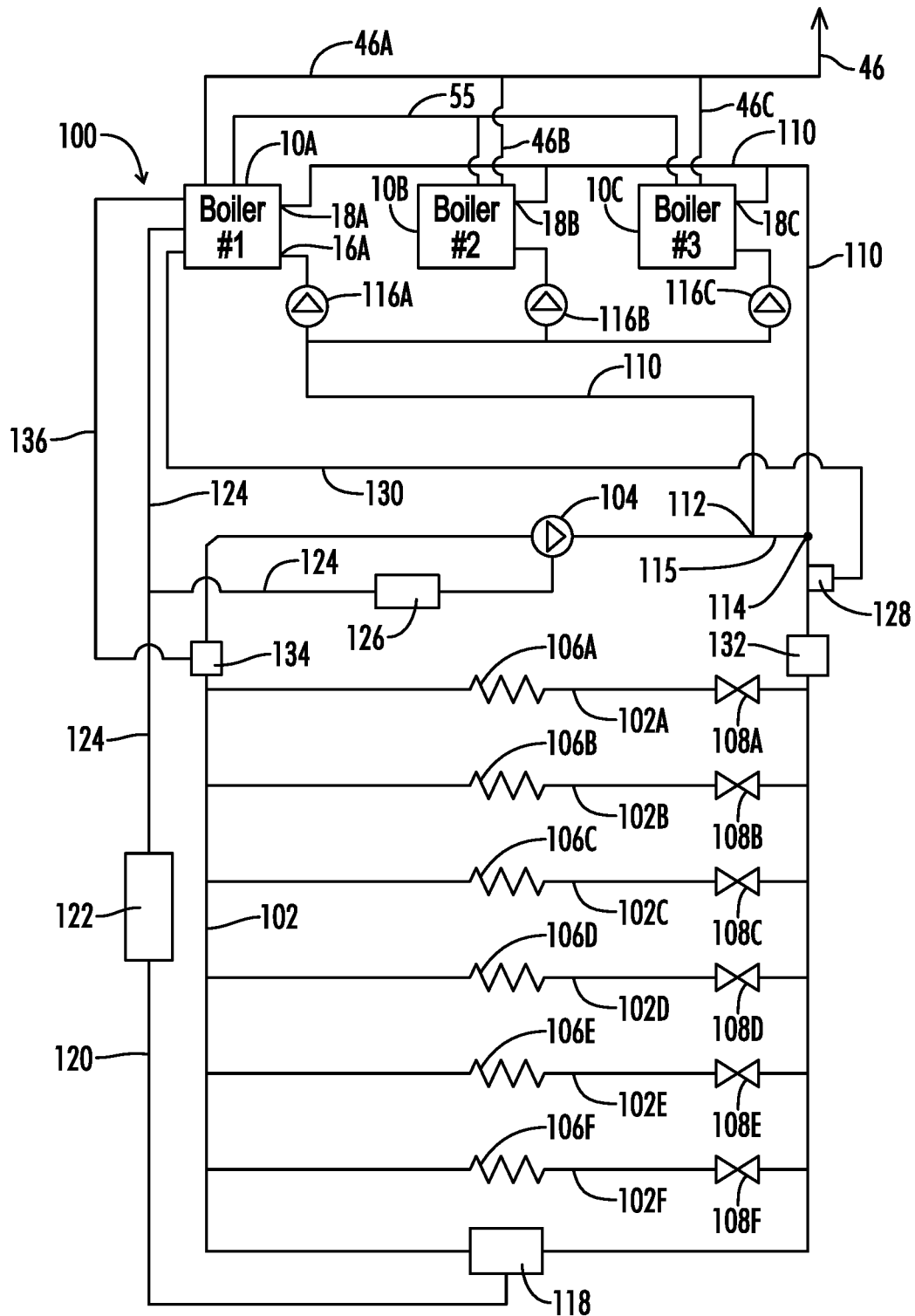
FIG. 5 is a schematic illustration of a plurality of boilers, in this example three boilers, operating together to provide hot water to a variable flow heating system.

Referring now to FIG. 5, a variable flow heating system is there schematically shown and generally designated by the numeral 100. The heating system 100 will include a plurality of the boilers 10, and in the embodiment illustrated in FIG. 5 there are three boilers which are designated as 10A, 10B and 10C.

The heating system 100 includes a primary flow loop 102 through which heated water is circulated by one or more primary system flow pumps 104. The primary flow loop 102 is broken into a plurality of parallel zones such as 102A, 102B, 102C, etc., each of which includes a heating load designated as 106A, 106B, 106C, etc., and each of which includes a zone valve 108A, 108B, 108C, etc. for controlling flow into the respective zone.

The primary flow loop 102, may for example be providing water to a heating system for heating various areas of a building, and the various heating loads 106A, 106B, 106C, etc. may represent the radiators contained in each area of the building. Heat to a given area of the building may be turned on or off by controlling the zone valves 108. Thus, as the radiator is turned on and off or as the desired heat is regulated in various zones of the building, the water flow permitted to that zone by zone valve 108 will vary, thus providing a varying water flow through the primary flow loop 102 and a varying heat load on the system 100.

The hot water is provided to primary flow loop 102 from secondary loop 110 in which the boilers 10A, 10B and 10C are located. The secondary flow loop 110 takes water from the primary flow loop 102 at water takeoff point 112 and returns heated water to the primary flow loop 102 at water supply point 114. A short joining portion 115 of primary flow loop 102 provides open communication between the water takeoff point 112 and water supply point 114, and in normal operation the flow will be defined by the flow through the primary flow loop 102 and much of the water in primary flow loop 102 will flow directly from the pump 104 past water takeoff point 112 and water supply point 114 returning to the various zones of the primary flow loop 102 without going through the boilers. A portion of the water circulating in primary flow loop 102, however, will be drawn off to the boilers 10 so as to add further heat to the system.

The boilers 10A, 10B and 10C are connected in parallel within the secondary flow loop 110, and each has a boiler feed pump 116A, 116B and 116C which draws water from the water takeoff point 112 as needed and directs it to its associated boiler.

The water outlets 18A, 18B and 18C of each of the boilers 10A, 10B and 10C, respectively, are each connected to the secondary flow loop 110.

The system 100 is a closed system in that the water in primary loop 102 is continuously recirculated and no significant amount of make-up water is typically required.

The system is designed such that each of the subzones 102A through 102F of the primary flow loop 102 have substantially equal heating loads 106 and are designed to operate at a substantially constant pressure drop across the heating load. A pressure transducer 118 measures the pressure drop across the heating loads 106 and a signal is sent via line 120 to pressure controller 122 which in turn sends an analog speed signal via line 124 to a variable frequency drive 126 associated with the variable speed system pump 104. Line 124 also communicates the speed signal to the boiler 10A where it is input to the boiler controller 54 of FIG. 2.

A system supply temperature sensor 128 is located within the primary loop 102 upstream of the heating loads 106 and a signal indicative of that system supply water temperature is communicated via line 130 to the controller 54 of boiler 10A.

The various flues 46A, 46B and 46C from the boilers are shown connected as a common flue 46.

Although the system 100 shown in FIG. 5 is a closed loop system designed to use the hot water for heating purposes, it will be appreciated by those skilled in the art that the same control system principles described herein are equally applicable to a system of water heaters, which may also be referred to as boilers, which heat water supplied to a hot water reservoir or reservoirs from which that water is consumed. Conventional makeup water facilities would be utilized to provide makeup water to replace the water consumed from the reservoir.

System Control Based Upon Early Sensing of Changes in Water Flow in the Primary Loop In a commercial heating system having a general arrangement like that of FIG. 5, the flow rate of water in the primary loop 102 can change frequently and by a significant amount as the various heating zones 106 turn on and off. As this flow changes, the heat load of the system typically changes with it. In a typical prior art system the modulation of the boilers is controlled in response to a sensed system supply temperature sensor temperature such as would be sensed by a sensor such as the sensor 128 shown in FIG. 5. In such a prior art system the only indication the boilers have that the heat load has changed is when the temperature sensor detects a change in system temperature. If the heat load had dropped significantly, this could cause the sensed temperature to rise significantly as well and the modulating boiler would be forced to turn off. If the flow in the primary loop drops enough, it could even fall below the flow rate through the boilers, causing recirculation of hot water in the secondary flow loop 110 from point 114 to point 112 in a reverse direction from the normal flow through the connecting segment 115. When this happens, the high temperature limit switches 52 can trip. In either case, the boiler would eventually need to restart. The more times a boiler is forced to cycle on and off, the more wear and tear occurs on it and its components, and the shorter its life.

To overcome this problem, the control system of the present invention receives the signal from pressure controller 122 over line 124 which is indicative of the speed of the system pump 104 and thus is indicative of the flow through the primary loop 102. Thus changes in the speed signal indicate changes in the flow rate through the primary loop 102. Alternatively, a flow meter can be placed in the primary flow loop 102 such as indicated at locations 132 or 134. In either case a signal such as from flow meter 134 would travel over communication line 136 back to the controller 54 of boiler 10A. With the use of either the pump speed signal from pressure control 122 or the flow rate signal from flow meter 132 or 134, the controller 54 can be described as sensing a parameter corresponding to a change in system flow rate, such sensed parameter being a parameter other than a change in system temperature. In response to the sensed parameter, the controller 54 modulates the output of boiler 10A or of whichever of the other boilers 10B or 10C is in a modulating mode.

As will be appreciated by those skilled in the art, when one knows the various hydraulic parameters of the heating system 100, an expected change in heat load resulting from turning one of the heating zones on or off can be calculated based upon the sensed change in flow through the primary flow loop 102.

In the example illustrated, the signal from pressure control 122 to the variable frequency drive 126 is in the form of an electrical current having a magnitude between 4 and 20 mA. For one particular system, the algorithm correlating the change in flow rate to the expected change in heat demand from the system is in the form:

$$LF = (Ip - 4 \text{ mA}) / 16 \text{ mA}$$

$$P(t) = LF * \left\{ K1 * (Ts - Ta) + K2 * \left( \sum_{t=0}^{t=n} (Ts - Ta) \right) \right\}$$

Where:
Ip=Pump speed signal (4-20 mA)
LF=load factor
t=time interval
n=number of time intervals since start of heat demand
P(t)=target speed of blower
K1=proportional gain
K2=integral gain
Ts=setpoint temperature
Ta=actual temperature.

By sensing the change in flow rate, which will occur well before that change in flow rate can fully impact system temperature, the boilers 10 can be modulated in anticipation of changes in system temperature that would occur as a result of the change in system flow rate, thereby reducing changes in system temperature resulting from the change in system flow rate and reducing on and off recycling of the boilers.

Improved Methods for Cascading Sequence of Boilers

In the system 100, one, two or all three of the boilers 10 may be operating depending upon the heat demand from the system. And the system could have more than three boilers. The boilers are controlled in a cascade arrangement such that a first boiler such as boiler 10A comes on initially at its minimum firing rate, and is then modulated continuously up to its maximum firing rate. Then as system demand continues to climb, the second boiler 10B is turned on at its minimum firing rate and is continuously modulated until it reaches its maximum firing rate. If the heat demand is such that the entire combined output of both boilers one and two is not required, the first boiler 10A will remain firing at its maximum firing rate and the second boiler 10B will be modulated. Similarly if the system heat demand exceeds the capacity of the two boilers 10A and 10B, the third boiler 10C will be fired and it will modulate.

Figure 6:
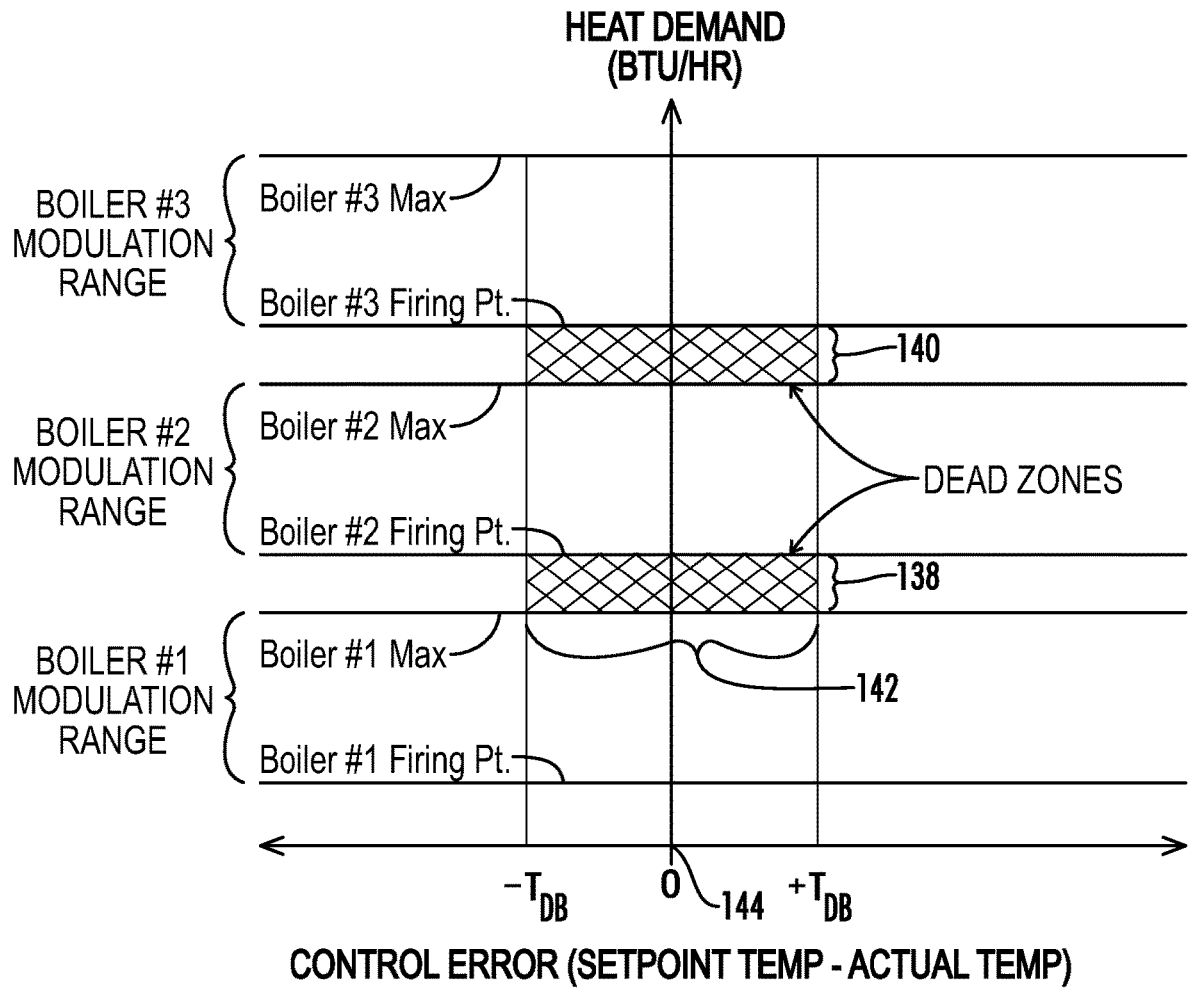
FIG. 6 is a schematic illustration of the system heat demand as placed upon the three boiler system of FIG. 5, graphically illustrating the deadbands in modulation range between each boiler and the next subsequent boiler in a cascading control sequence.

Referring now to FIG. 6 a graphical illustration is thereshown of the operation of the three boilers as heat demand increases. The graph of FIG. 6 represents heat demand on its vertical scale.

As will be appreciated by those skilled in the art, a gas fired boiler has a minimum firing point greater than zero. Typically the firing point of a gas fired boiler might be for example 25% of its maximum output. Thus a single boiler when fired provides at least 25% of its maximum output, and can be modulated between 25% and 100% of its maximum output.

Thus, as shown in FIG. 6 the minimum heat output that can be provided is the boiler number 1 minimum firing point. Boiler number one has a modulating range between its firing point and its maximum output. Then there is a first dead zone or deadband 138 between the maximum output of boiler number 1 and the sum of the maximum output of boiler number 1 and the firing point of boiler 10B. Then boiler 10B can modulate through its modulation range, and then there is a second dead zone 140 between the sum of the maximum output of boilers one and two plus the firing point of boiler three. Then boiler 10C can modulate to its maximum output which represents the maximum heat output of the system.

The problem areas for control of such a system fall in the two dead zones 138 and 140. In those zones it is not possible for the modulating boiler to closely track the heat demand of the system, because the modulating boiler is either on at its minimum firing point or it is off.

With a typical prior art system wherein the controller is trying to closely track the heat demand of the system by maintaining system water temperature such as at temperature sensor 132 at some setpoint which has been input to the controller, the system will cycle with an undesirable frequency if the system heat demand happens to fall within one of the dead zones 138 and 140.

The present invention significantly improves control within the dead zones 138 or 140 by allowing the water supply temperature sensed at 132 to vary at least within a defined temperature range 142, graphically illustrated in FIG. 6 as spanning the temperature setpoint 144, before the second boiler or whichever boiler is modulating is turned on or off.

The horizontal scale on FIG. 6 represents the control error which is the setpoint temperature minus the actual sensed temperature, as indicated in the two crosshatched areas within the dead zones 138 and 140 located between the upper and lower limits $+T_{DB}$ and $-T_{DB}$. Thus the crosshatched areas represent the control error permitted in the dead zones. When the heat demand of the system is in one of the dead zones, and the control error is small, that is it falls between $-T_{DB}$ and $+T_{DB}$, the controller stops trying to adjust the output of the system and the modulating boiler remains either on at its minimum firing point or off. Eventually, when the control error exceeds the upper or lower limit $\pm T_{DB}$, the controller will resume adjusting the total output by turning the last modulating boiler either on or off.

Thus the operation of the system can be described as follows. When a heat demand upon the plurality of boilers falls within the modulation range of the first boiler 10A, boiler 10A will be continuously modulated to maintain its output such that the water supply temperature sensed at 132 remains substantially equal to the temperature setpoint.

When the heat demand upon the plurality of boilers falls within the first deadband 138, the water supply temperature sensed at 132 is allowed to vary at least $\pm T_{DB}$ about the setpoint before the second boiler is turned on or off. Thus, if only the first boiler is on, and the system heat demand rises into the first dead zone 138, boiler 10A will remain firing at its maximum load, and boiler 10B will not turn on until the system temperature drops below setpoint $-T_{DB}$. After that point boiler 10B will turn on at its minimum firing point and will remain firing at its minimum firing point until system temperature exceeds the setpoint $+T_{DB}$ after which point boiler 10B will again turn off. So long as total system demand remains in the first dead zone 138, boiler 10B will turn on after sensed temperature at 132 drops to setpoint $-T_{DB}$, and boiler 10B will fire at its minimum firing point until the sensed temperature at 132 exceeds setpoint $+T_{DB}$.

More preferably, the boiler 10B is not turned on until system temperature falls below the setpoint $-T_{DB}$ sufficiently that the system heat demand rises to the sum of the maximum output of boiler 10A plus the minimum output of boiler 10B. Then the boiler 10B remains on at its minimum firing point until the sensed temperature at 132 exceeds setpoint $+T_{DB}$ sufficiently that the system heat demand drops to the maximum output of boiler 10A. Also, the control system preferably "freezes" its calculation of heat demand during such time as the system temperature is within the range of setpoint $\pm T_{DB}$. After the system temperature goes outside that range, the controller again begins calculating system heat demand.

If the system heat demand continues to rise to where the total heat demand rises above the first dead zone 138 into boiler 10B's modulating range, then the control system will once again begin continuously modulating the output of boiler 10B to keep the temperature sensed at 132 substantially equal to the setpoint.

If system demand then rises into the second dead zone 140, boilers 10A and 10B will continue to fire at their maximum output, and boiler 10C will be turned on and off at its minimum firing point as the sensed temperature drops below or rises above setpoint $\pm T_{DB}$. When total system demand rises above the second dead zone 140 into the modulating range of boiler 10C, the control system will once again begin to continuously modulate boiler 10C to keep temperature sensed at 132 substantially at the setpoint.

As seen in FIG. 6, the temperature setpoint is preferably in the middle of the defined range 142. The defined temperature range is preferably equal to the temperature setpoint plus or minus a constant. The constant will typically be in the range of from about 3° F. to about 7° F., and preferably the temperature constant is about 5° F. so that the defined range 142 is preferably equal to the setpoint plus or minus 5° F.

The width of the dead zone temperature range is typically set in the software of the controller 54 by the manufacturer or installer, and is not typically adjustable by the user of the system.

It will be appreciated that each of the boilers 10 includes a controller 54 and any one of the boilers 10A, 10B or 10C may serve as a lead boiler and its controller as the master controller. Preferably the role of lead boiler is periodically rotated between each of the boilers in the system so as to substantially equalize the number of operating hours experienced by each boiler. Thus although the description above generally refers to boiler 10A as boiler number 1 and describes the controller 54 of boiler 10A as performing the control function, it will be understood that the role of lead boiler can rotate to any of the other boilers.

In general the controller 54 of whichever boiler is serving as lead boiler is operable to serve as a master controller to designate an operating sequence of the boilers. The controller 54 includes a control logic operable to define a combined operating range of the plurality of boilers including a deadband such as 138 between a maximum output of one boiler such as boiler 10A and the sum of the maximum output of the one boiler 10A plus a minimum output of the sequentially next boiler 10B, the control system being operable when a system heat demand falls within the deadband to allow the sensed water temperature to vary within the temperature range 142 spanning the temperature setpoint 144 before the sequentially next boiler 10B is turned on or off. The controllers 54 of the three boilers 10A, 10B and 10C of FIG. 5 are communicated with each other via a cascade bus 55.

The cascading control system is operable, when the heat demand falls within the deadband, to turn the sequentially next boiler on after the sensed water temperature falls below the temperature range 142, and to maintain the sequentially next boiler at a constant output, typically its minimum firing point, until the sensed water temperature exceeds an upper end of the temperature range 142, and to then turn off the sequentially next boiler.

Prevention of Flue Gas Condensation

A third issue addressed by the control system of the present invention is the problem of condensation of water vapor from the combustion products exhausted from each of the boilers into the flue 46.

Non-modulating boilers are typically designed to operate constantly at their maximum heat output which is typically designed so that the exhaust temperatures of the combustion products from the boiler will be high enough to prevent condensation of water vapor from the exhaust gasses. With modulating boilers, however, many prior art systems encounter a problem in that when the heat output of a given boiler is turned down below a certain level the temperature of the exhaust gasses will not be high enough to ensure that there is not condensation of water vapor as those exhaust gasses pass through the vent flue. Thus many modulating boilers typically require the use of expensive Category II or Category IV venting materials. Furthermore, when Category IV venting materials are required, each boiler is required by codes to be vented separately, instead of venting to a common vent. The reason the vent materials are expensive is that the flue temperature can get low enough that the water vapor in the flue product will condense within the flue. This condensation is acidic, and therefore the vent material must withstand this acidity. References to Category I, II or IV venting materials are with reference to ANSI Z21.10.3 and ANSI Z21.13 standards.

To overcome this limitation, the present invention provides a flue temperature sensor 44 (see FIG. 4) to measure the temperature of the flue gas products going into the flue. The control system of the present invention, then controls the modulation of the boiler to maintain the minimum flue temperature required to prevent condensation in the flue. For example, typically the exhaust gas temperature should be maintained at a temperature of greater than about 300° F. to prevent condensation.

Thus for a typical boiler, the boiler may be required to be firing at a level of for example 50%, which is substantially above its minimum firing point of 25%, in order to maintain the exhaust gas temperature high enough to prevent condensation. This will effectively reduce the modulating range of the boiler so that it must modulate between 50% and 100% of its total output (i.e. a 2:1 turndown ratio) rather than being able to modulate between 25% and 100% of its maximum output (i.e. a 4:1 turndown ratio).

When utilizing the deadband control scheme of FIG. 6, this will effectively increase the height of the deadbands 138 and 140 to extend from zero to 50% of the output of the modulating boiler rather than from zero to 25% as was illustrated in FIG. 6.

This allows the boiler to compensate for the various conditions that influence flue temperature, so that more modulation is available when these conditions are more favorable. Some of the conditions that influence the flue gas temperature are the water temperature of the water flowing through the heat exchanger of the boiler, the outdoor temperature of inlet air being drawn into the burner of the boiler, and the flow rate of water going through the heat exchanger of the boiler.

By insuring that there will be no condensation of flue products, less expensive Category I flues can be utilized and all of the flues can be joined together to a common exhaust which substantially reduces the cost of the exhaust system from the boiler system.

Thus it is seen that the apparatus and methods of the present invention readily achieve the ends and advantages mentioned as well as those inherent therein. While certain preferred embodiments of the invention have been illustrated and described for purposes of the present disclosure, numerous changes in parts and steps may be made by those skilled in the art, which changes are encompassed within the scope and spirit of the present invention as defined by the appended claims.

What is claimed is:

1. A water heating system, comprising:
   a water supply system;
   a flow meter connected to the water supply system and configured to provide a water flow rate signal corresponding to a water flow rate;
   a modulating water heater connected to the water supply system for heating water for the water supply system, the modulating water heater being a gas fired water heater including:
   a variable output radially outwardly firing elongated burner;
   a fin tube heat exchanger arranged concentrically about the burner such that water flowing through the heat exchanger receives heat from the burner radiating directly upon exterior fins of the fin tube heat exchanger;

a water inlet to the heat exchanger;
a water outlet from the heat exchanger;
a control valve upstream of the water inlet for controlling flow of water into the water inlet; and
a blower including a variable speed drive motor, the blower being configured to provide a variable flow of premixed gas and combustion air to the burner; and
a controller configured to:
receive the water flow rate signal from the flow meter;
control modulation of the modulating water heater by controlling a speed of the variable speed drive motor of the blower, and thereby controlling the flow of premixed gas and combustion air to the burner in response at least in part to a change in the water flow rate signal; and
control the control valve and thereby control the flow of water to the water inlet.

2. The system of claim 1, wherein:
the modulating water heater further includes a bypass line connecting the water inlet and the water outlet, and a recirculation valve communicated with the bypass line; and
the controller is further configured to control the recirculation valve to control recirculation of water through the bypass line to the water inlet.

3. The system of claim 2, wherein:
the control valve and the recirculation valve are combined as a single three way control valve.

4. The system of claim 1, further comprising:
at least one additional modulating water heater connected to the water supply system; and
at least one additional controller associated with the at least one additional modulating water heater, the controllers being communicated with each other for coordinated operation of the water heaters.

5. The system of claim 4, wherein:
each of the modulating water heaters further includes a bypass line connecting the water inlet and the water outlet, and a recirculation valve communicated with the bypass line; and
each of the controllers is configured to control the recirculation valve of its associated modulating water heater to control recirculation of water individually in each of the modulating water heaters.

6. The system of claim 5, wherein:
the control valve and the recirculation valve of each of the respective modulating water heaters are combined as a single three way control valve.

7. The system of claim 5, wherein:
the water supply system is configured to deliver the heated water to at least one point of use for consumption.

8. The system of claim 4, wherein:
the water supply system is configured to deliver the heated water to at least one point of use for consumption.

9. The system of claim 1, wherein:
the water supply system includes a primary flow loop configured to provide heated water to at least one point of use and to return at least some of the water from the at least one point of use.

10. The system of claim 9, wherein:
the primary flow loop is a closed loop configured to supply heated water to the at least one point of use for heating a space, and to return the heated water to the secondary flow loop.

11. The system of claim 1, wherein:
the water supply system is configured to deliver the heated water to at least one point of use for consumption.

12. The system of claim 1, wherein:
the controller further comprises a control algorithm based in part upon the water flow rate signal corresponding to the water flow rate.

13. The system of claim 12, wherein:
the control algorithm is also based upon a second input signal corresponding to a temperature of the water supply system.

14. The system of claim 13, further comprising:
a water inlet temperature sensor;
a water outlet temperature sensor; and
wherein the controller is configured to receive temperature signals from each of the temperature sensors.

15. The system of claim 14, further comprising:
an exhaust gas temperature sensor; and
wherein the controller is configured to receive a signal from the exhaust gas temperature sensor.

16. The system of claim 1, wherein:
the controller is further configured such that the control of modulation of the modulating water heater occurs prior to a change in the water flow rate fully impacting a system temperature of the water supply system.

17. The system of claim 1, wherein:
the controller is further configured such that the control of modulation of the modulating water heater occurs prior to a change in the water flow rate fully impacting a system temperature of the water supply system, thereby allowing the modulating water heater to be modulated in anticipation of changes in the system temperature that would occur as a result of the change in the water flow rate.

18. The system of claim 1, wherein:
the controller is further configured such that the control of modulation of the modulating water heater occurs prior to a change in the water flow rate fully impacting a system temperature of the water supply system, thereby allowing the modulating water heater to be modulated in anticipation of changes in the system temperature that would occur as a result of the change in the water flow rate, thereby reducing changes in system temperature resulting from the change in the water flow rate.

19. The system of claim 1, wherein:
the controller is further configured such that the control of modulation of the modulating water heater occurs prior to a change in the water flow rate fully impacting a system temperature of the water supply system, thereby allowing the modulating water heater to be modulated in anticipation of changes in the system temperature that would occur as a result of the change in the water flow rate, thereby reducing changes in system temperature resulting from the change in the water flow rate and reducing on and off cycling of the modulating water heater.

* * * * *